(12) United States Patent
Hsu

(10) Patent No.: US 8,944,914 B2
(45) Date of Patent: Feb. 3, 2015

(54) CONTROL OF TRANSLATIONAL MOVEMENT AND FIELD OF VIEW OF A CHARACTER WITHIN A VIRTUAL WORLD AS RENDERED ON A DISPLAY

(71) Applicant: PNI Sensor Corporation, Santa Rosa, CA (US)

(72) Inventor: George Hsu, Boca Raton, FL (US)

(73) Assignee: PNI Sensor Corporation, Santa Rosa, CA (US)

( * ) Notice: Subject to any disclaimer, the term of this patent is extended or adjusted under 35 U.S.C. 154(b) by 21 days.

(21) Appl. No.: 13/710,602

(22) Filed: Dec. 11, 2012

(65) Prior Publication Data

US 2014/0162777 A1    Jun. 12, 2014

(51) Int. Cl.
    *A63F 9/24*    (2006.01)
(52) U.S. Cl.
    USPC ................... 463/39; 463/42; 463/31
(58) Field of Classification Search
    USPC .................... 463/31–42, 2; 345/156; 382/103
    See application file for complete search history.

(56) References Cited

U.S. PATENT DOCUMENTS

| 8,342,968 B2* | 1/2013 | Fuccillo et al. .................. 463/49 |
| 8,408,982 B2* | 4/2013 | Marty et al. ...................... 463/2 |
| 8,579,707 B2* | 11/2013 | Lin .................................. 463/37 |
| 2010/0285883 A1* | 11/2010 | Zalewski ......................... 463/39 |
| 2012/0050157 A1 | 3/2012 | Latta et al. |
| 2012/0155705 A1 | 6/2012 | Latta et al. |
| 2012/0215328 A1 | 8/2012 | Schmelzer |
| 2012/0258804 A1 | 10/2012 | Ahmed |
| 2012/0276998 A1 | 11/2012 | Osman |

* cited by examiner

*Primary Examiner* — Masud Ahmed
(74) *Attorney, Agent, or Firm* — Brian R. Short

(57) ABSTRACT

Apparatuses, methods and systems for controlling a view of a virtual world character on a display are disclosed. One apparatus includes a controller, wherein the controller is operative to control translational movement and field of view of a character within a virtual world as rendered on a display based upon a first input and second input. The first input controls the translational movement of the character within the virtual world, and the second input controls the field of view as seen by the character within the virtual world. The video game apparatus further includes a sensor for sensing a spatial position of a user, wherein the sensor provides the first input based on the sensed spatial position of the user.

20 Claims, 4 Drawing Sheets

CONTROL OF TRANSLATIONAL MOVEMENT AND FIELD OF VIEW OF A CHARACTER WITHIN A VIRTUAL WORLD AS RENDERED ON A DISPLAY

FIELD OF THE EMBODIMENTS

The described embodiments relate generally to controlling a display. More particularly, the described embodiments relate to apparatuses, methods and systems for controlling a virtual world character's point of view on a display based upon sensed spatial position of a user.

BACKGROUND

First Person Shooter (FPS) video games represent a category of video games in which the viewpoint of game play is shown from the perspective of the main character as the user moves his character and battles through various game scenes representing different levels of the game. The vast majority of FPS games are combat-based in which the main character is engaged in battle against various enemy combatants. The theme and context of the game's storyline can be based upon history, action/adventure, science fiction or fantasy.

FPS games came into existence as the graphics processing capability of video gaming platforms, whether console-based or personal computer-based (PC), became powerful enough to graphically render immersive virtual battlefield scenes and other three dimensional virtual worlds for gaming. Once the graphics proved capable enough, the controls to play such games soon followed suit. Two primary forms of controllers developed to support play on these two main platforms. The keyboard was the primary form of controller used with PC-based games, while the D-Pad and its derivatives and antecedents became the primary forms of play control for console-based FPS games. Each enabled the player to move his character within a scene as well as from one scene to another. The player could also change his character's field of view as well as select and activate various shooting weapons for combat play.

The D-Pad ("Directional Pad") controller was first developed for use by Nintendo® Corporation of Japan. This controller device was held with both hands with the player's thumbs on top of each half of the controller respectively. The control mechanism was activated by depressing it with each of the user's respective thumbs and was a cross-shaped ("Red Cross"-shaped to be exact) spring-tensioned rocker switch for use under the left thumb, while the right thumb had control over two buttons labeled "A" and "B." The cross-shaped switch controlled by the left thumb would move the character right, left, forward and backward within its virtual world in response to which of the cross's four arms was depressed. The right thumb switch would be used to pan the around the character's field of view within the virtual world, which required finer and more precise movements. This partitioning of right versus left thumb control was determined based upon the fact that right-handed players could control gross movements with their left hands, while fine coordination is more naturally and quickly controlled by right handers' right thumbs. The weapons' points of aim would always remain screen centric and thus the weapons would be aimed at their targets by a control combination of the user's left and right thumbs.

By the second generation of console games, Play Station 2® and X-Box®, the rocker switch D-Pad controller was further enhanced by the addition to the rocker switch of two additional "thumb-sticks", which are miniature joysticks that can be fully articulated solely by using the tip of the thumb, one for each thumb. These thumb-sticks could also provide measurable levels of displacement that could then be further mapped to effectuate control of character movement of differing rates, with small displacements corresponding to slow movement and large displacements corresponding to fast movement within the virtual world. The addition of thumb-sticks to the original D-Pad controller design allowed for much more responsive and instantaneous character control that was highly reflexive, precise and accurate. This type of improved D-Pad controller became widely known as a Dual Analog Stick controller and has not changed much since for any of the major gaming console platforms, especially for FPS game play.

This second-generation D-Pad (Dual Analog Stick) controller has played a key role in paving the way to the widespread adoption of FPS games, and has been as critical in bringing FPS games to a broad user base as has the enhanced graphics processing capability of the gaming consoles. In fact, in today's console-based gaming market, FPS games account for fully one-third of all game titles sold in the video gaming market. The demographic of primary FPS game players constitutes what is known as the "hardcore gamer" segment within the general video game playing population. This is a highly sought after segment of the market by both the video console manufacturers as well as the video game title publishers as it tends to lead to console adoption within the broader market and offers a much sought after validation of a console's gaming worth. The major manufacturers of video game consoles at present are Nintendo®, Microsoft X-Box® and Sony Playstation®. FPS title franchises include Halo, Medal of Honor, Call of Duty, Modern Warfare and Resident Evil.

Few other video game experiences can match the sense of immersive play that FPS games provide. FPS games almost all involve some form of shooting weapon that the main character deploys against a variety of enemies that become increasingly challenging and lethal as game play progresses. The player's character traverses various scenes, which typically constitute different game levels, and eliminates enemy characters by shooting them within those levels as they are encountered. The Dual Analog Stick controls character movement and weapon aim by means of the thumb sticks as previously described. The left thumb stick controls character movement—forward, backwards, strafe left and strafe right, while the right thumb stick controls the character's field of view—pan up, pan down, pan left and pan right, exactly as a joystick would be used to control a fully articulating remote controlled camera mounted on a tripod.

Movement using the left thumb stick is strictly relative to the center of the first person character's current field of view, so by panning the character's camera angle by use of the right thumb stick, realignment of the character's direction of line of movement is controlled by the left thumb stick. For instance, if the character is currently "looking" at 90 degrees due East in a scene, then by moving the left thumb stick forward, the character would now start to move forward due East within the scene. As soon as the camera angle is changed using the right thumb stick to 0 degrees due North, the same forward displacement of the left thumb stick now moves the character straight ahead, but due North within the scene. All character movement in FPS games is relative to the center of the camera's field of view, as is the aiming point of the weapon that the character is firing. Because of this, most FPS games place a graphical representation of a weapon scope's crosshair exactly within the center of the display. In order to shoot and hit an enemy, the user must use the combination of left and right thumb sticks to maneuver the target into the middle of the crosshair (and thus display) before depressing the trigger. The trajectory and point of impact of the weapon's projectile corresponds to the point that is in the center of the crosshair and display.

Thus, a player's objective is to move through a scene and as the user encounters enemies, the user must maneuver the enemy into the center of his character's field of view through a combination of movement control via the left thumb stick and camera pan control via the right thumb stick. Successfully doing this then aligns the cross hair at the center of the display to the enemy to be fired upon and trigger button is then depressed to successfully engage the enemy. This method of weapon aiming is effective for the current state of game control available presently, but is the least realistic aspect of all modern FPS games. Several degrees of freedom that a real life combat situation would entail are necessarily forgone due to the limitations of the existing controller technology.

It is desirable to have apparatuses, methods, and systems for controlling a view of a virtual world character on a display based on the sensed spatial position of the user, thereby allowing enhancement of FPS games.

SUMMARY

An embodiment includes a video game apparatus. The apparatus includes a controller, wherein the controller is operative to control translational movement and field of view of a character within a virtual world as rendered on a display based upon a first input and second input. The first input controls the translational movement of the character within the virtual world, and the second input controls the field of view as seen by the character within the virtual world. The video game apparatus further includes a sensor for sensing a spatial position of a user, wherein the sensor provides the first input based on the sensed spatial position of the user.

Another embodiment includes a method of controlling a view as would be seen by a character within a virtual world, rendered on a display. The method includes controlling translational movement of the character within the virtual world based on a first input, controlling a field of view as seen by the character within the virtual world based on a second input, and sensing a spatial position of a user, wherein the sensed spatial position provides the first input based upon the sensed spatial position of the user.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide for apparatuses, methods, and systems for controlling a view of a character within a virtual world as rendered on a display based on the sensed spatial position of a user. At least two inputs are generated for controlling the view of the character within the virtual world on the display. At least one of the inputs is generated based on sensing spatial position of a user, and/or of a device associated with the user. The described embodiments provide a video game platform that provides a more realistic experience for, as an example, a video game user controlling and shooting a gaming weapon.

Figure 1:
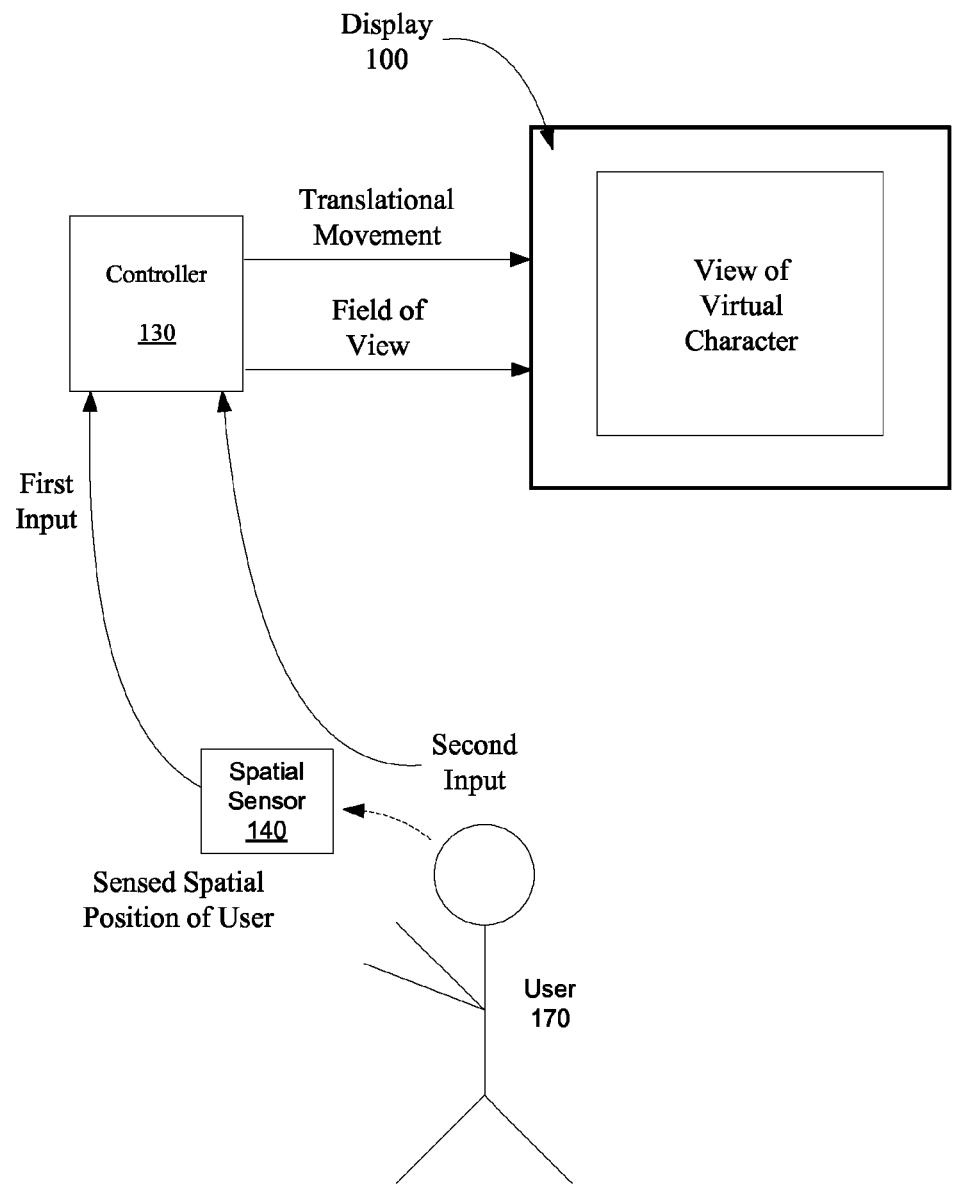
FIG. 1 shows a video game apparatus, according to an embodiment.

FIG. 1 shows a video game apparatus, according to an embodiment. The video game apparatus includes a controller 130 operative to control translational movement and field of view of a character within a virtual world as rendered on a display 100 based upon a first input and second input. For an embodiment, the first input controls the translational movement of the character within the virtual world, and the second input controls the field of view as seen by character within the virtual world. The video game apparatus further includes a sensor 140 for sensing a spatial position of a user, wherein the sensor 140 provides the first input (translational movement control) based upon the sensed spatial position of the user.

As will be described, the spatial position of the user 170 can be sensed in many different ways. For an embodiment, the spatial position of the user 170 can be sensed using one or more cameras located proximate to the display. The one or more cameras sense the spatial position of the user, for example, when the user 170 is playing a First Person Shooter (FPS) video game. This embodiment provides a more realistic video game experience as the body motion of the user 170 effects the view of the character within virtual world of the game in real-time, and provides a user experience in which the user 170 is more "a part of the game" than present FPS video games allow.

While at least one of the described embodiments include one or more cameras sensing the spatial position of the user, other embodiments include additional or alternate sensing techniques for sensing the spatial position of the user. For example, the spatial position of the user 170 can also be sensed in three-dimensional real space by using active magnetic distance sensing wherein an AC magnetic source is generated either on the user 170 or from a fixed reference position and an opposing magnetic detector is appropriately configured. In another embodiment, passive DC magnetic sources, such as permanent magnets or electro-magnetic coils, and DC magnetic sensors could be used in a similar configuration.

At least some embodiments further include detecting distance and position from a user 170 to a reference point in space. At least some of these embodiments include ultrasonic transducers, radar, inertial positioning, radio signal triangulation or even mechanical mechanisms such as rods and encoders. Other possible but less practical embodiments include, by way of example, capacitive sensors spaced around the user's body to measure changes in capacitance as the user 170 moves closer or further away from capacitive sensors, or load sensors spaced in an array configuration around the user's feet to detect where the user's weight is at any given time with respect to a reference and by inference the user's position. It should be evident that there are many techniques known to one with ordinary skill in the art of spatial position and distance detecting and that the foregoing detection techniques were presented by way of example and not meant to be limiting.

Further, specific body parts of the user, and/or a device (such as, a gaming weapon) can be sensed. For at least some embodiments, specific (rather than several or all) body parts of the user 170 are sensed. Specific examples include sensing the spatial position of the user's head, shoulders or torso.

Figure 2:
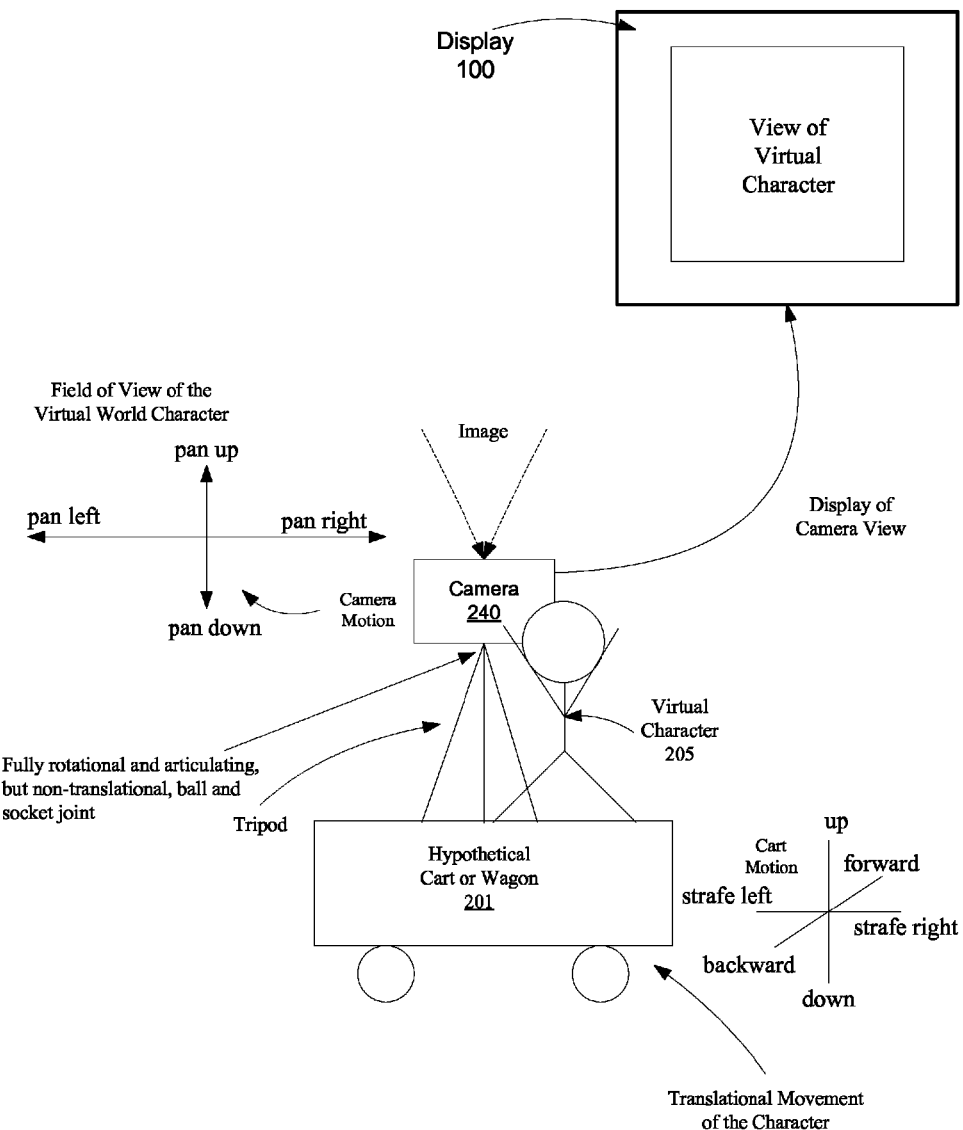
FIG. 2 shows an example of a character within a virtual world for providing an illustration of translational motion and field of view of the character within the virtual world, according to an embodiment.

FIG. 2 shows an example of a character within a virtual world for providing an illustration of translational motion of the character and field of view as seen by the character within a virtual world that are controlled by the first input and the second input. This illustration includes, for example, a cart or wagon 201 serving as a fully translational camera platform in the X, Y and Z coordinates of the virtual world, which is moveable up, down, left, right, forward and backward directions absent rotations about any of its axes. Residing on the cart 201 is the virtual world character 205, wherein the virtual world character 205 is looking through a camera's viewfinder, wherein the camera 240 is mounted on a tripod with a fully rotational and articulating, but non-translational, ball and socket joint, wherein the tripod is mounted atop the cart 201. As shown, the display 100 is connected to the output of the camera, and therefore, provides a view of the virtual world as perceived by the character 205 through the camera's viewfinder, and thus, the user is able to share and experience the same exact view of the virtual world as seen and experienced by the character within it.

It is to be understood that the character 205 of FIG. 2 within the virtual world is a hypothetical character that is depicted to illustrate the visual display being provided to the user on the display 100 while the user is playing a video game (or other application) using the described embodiments. Further, the first input and the second input provided by the user control the translational movement of and field of view as seen by the character within the virtual world, which are represented in FIG. 2.

Translational Movement Control

As shown in FIG. 2, the translational motion of the character 205 within the virtual world occurs, for example, by the character 205 moving the camera 240 up, down, right, left, forwards or backwards, absent rotations, within the virtual world. Specifically, the first input controls the translational movement, absent rotations, of the cart or wagon 201 within the virtual world. The user sees the results of this translational movement rendered on the display. This translational motion is provided by sensing and tracking the user's position in 3 dimensional space.

As related to FIG. 1, for an embodiment, the translational movement of the character includes forwards, backwards, strafe left and strafe right. For an embodiment, the translational movement of the character of the first input control is strictly relative to and along the direction of a line of motion when moving forwards and backwards, or exactly orthogonal to it when strafing left, strafing right, jumping up or crouching down. This line of motion is always fixed to be perpendicular to the camera's viewfinder, and thus, display, and is centered within the current field of view unless the character is ascending or descending non-level terrain, wherein the direction of translational movement can occur at an oblique angle to the perpendicular angle formed with the center of the current field of view.

Field of View

As shown in FIG. 2, control of the field of view as seen by the character 205 within the virtual world occurs, for example, by moving the articulating camera 240 atop the tripod in its ball and socket joint in any configuration of possible, but purely rotational, movements as enabled by a fully articulating ball and socket joint, including pan right, pan left, pan up, and pan down rotations which is then rendered to the display 100.

As related to FIG. 1, for an embodiment, the field of view as seen by the character within the virtual world includes pan up, pan down, pan left and pan right. For an embodiment, the field of view as seen by the character within the virtual world of the second input control redirects movement within a scene that the first input controls.

For an embodiment, the user controls the translational movement of and the field of view as seen by a character within a virtual world that is displayed on the display, wherein the character is associated with a first person shooter game. For an embodiment, the translational movement allows the user to adjust the aiming point of crosshairs of the weapon controlled by the character within a particular scene. For an embodiment, the particular scene remains static while the crosshairs of the weapon are controllably adjusted.

Sensed Spatial Position of the User

Various embodiments exist for sensing the spatial position of the user. For an embodiment, the spatial position of the user or device (such as a gaming weapon or other device associated with the user) is sensed and tracked. For at least some embodiments, the device (weapon or gun) is tracking in 3 dimensional real space for the purposes of geometric correction necessary to accurately render the positioning of crosshairs on the display. At least some embodiments further utilize the 3 dimensional real space tracking of the device for tracking the position of the user as well.

For at least some embodiments, as previously described, the user's position is determined in three dimensional real space using active magnetic distance sensing wherein an AC magnetic source is generated either on the user or from a fixed reference position and an opposing magnetic detector is appropriately configured. In another embodiment, passive DC magnetic sources, such as permanent magnets or electromagnetic coils, and DC magnetic sensors could be used in a similar configuration. Further embodiments to detect distance and position from a user to a reference point in space include ultrasonic transducers, radar, inertial positioning, radio signal triangulation or even mechanical mechanisms such as rods and encoders. Other possible embodiments include, by way of example, capacitive sensors spaced around the user's body to measure changes in capacitance as the user moves closer or further away from capacitive sensors, or load sensors spaced in an array configuration around the user's feet to detect where the user's weight is at any given time with respect to a reference and by inference the user's position.

For at least some embodiments, improvements in the spatial sensing can be used to enhance a position sensor's performance in more accurately detecting the user's position. For example, an embodiment includes one or more reflectors placed on the user's body or the device that the user is holding for use with the camera, radar or ultrasonic techniques. For at least some embodiments, objects that can emit an active signal (such as an LED for the optical system) are placed on the user's body or the device that he is holding. For at least some embodiments, an object of a given color (green for instance), geometry (circle, sphere, triangle, square, star, etc) or a combination of both (a green sphere) are placed on the user's body or the device that the user is holding.

At least some embodiments include additional sensors for enhancing a user's game play. For example, for an embodiment, an orientation sensor is included within the device (gaming weapon) that the user is holding. Based upon the system's determination of user's position, the weapon's position (supplied by the position sensor) and the weapon's orientation (provided by its internal orientation sensor) the aiming point of the weapon can be accurately controlled for display relative to the character and the user's point of view within the virtual world. For another embodiment, the user position sensor (optical, ultrasound, radar, etc) is used to not only determine the position of user and the device, but also to determine the device's orientation.

Figure 3:
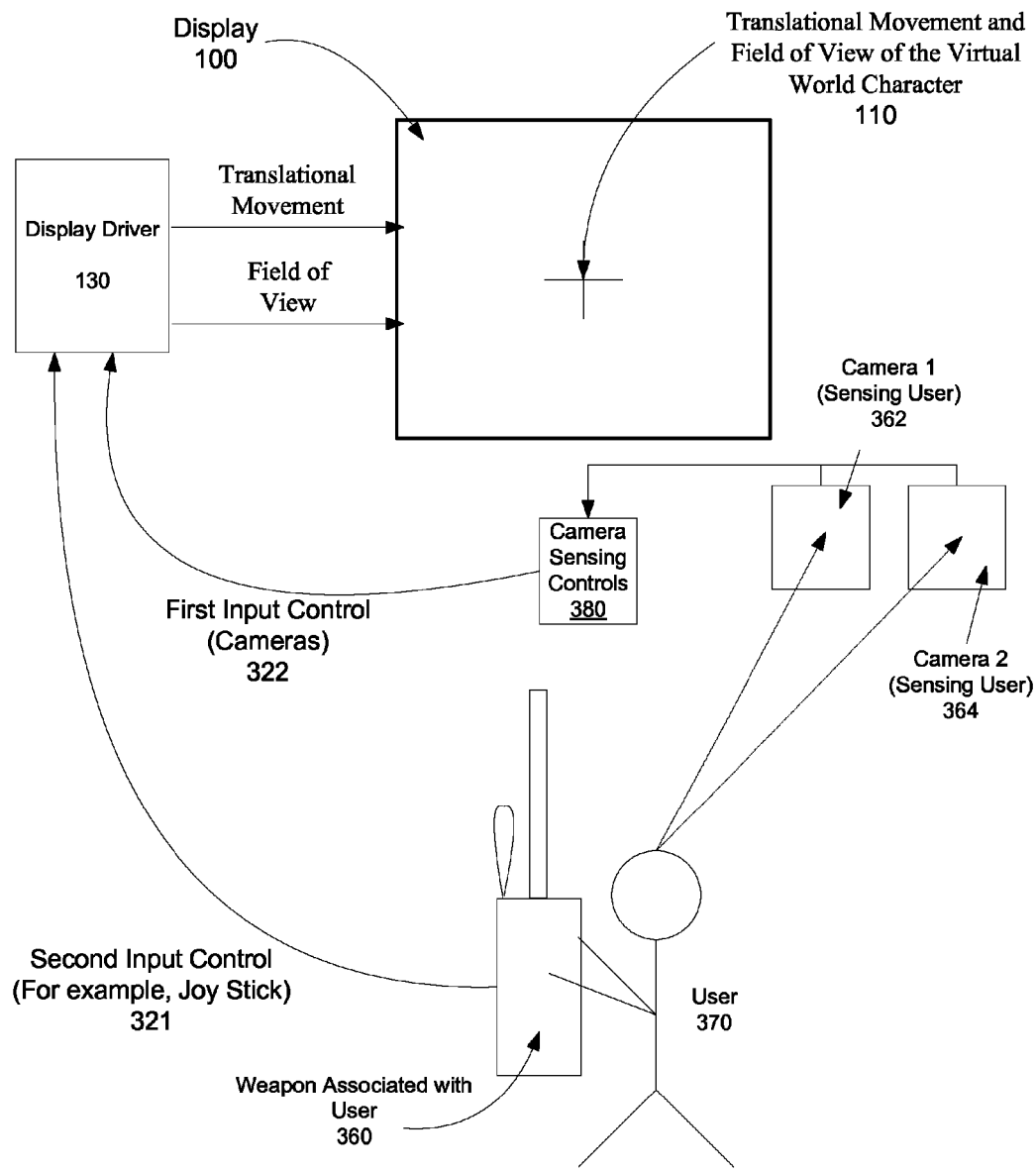
FIG. 3 shows another video game apparatus, according to another embodiment.

FIG. 3 shows another video game apparatus, according to another embodiment. For this embodiment, the sensor includes a camera. For an embodiment, the camera is located proximate to the display 100 and senses spatial position of the user 370.

FIG. 3 shows multiple cameras 362, 364 sensing the spatial position of the user 370. That is, the spatial position sensor includes a plurality of cameras 362, 364, and senses changes in a depth position of the user 370 relative to the display. Outputs of the cameras 362, 364 are received by a camera sensing controller 380 which generates a signal representing the sensed spatial position of the user 370, which provides the first input control 322.

As shown in FIG. 3, for an embodiment, the second input control 321 is provided by a joystick that is located, for example, on the gaming weapon 360 that the user 370 is using as part of a game.

As previously described, translational movement of and field of view as seen by the character 110 within the virtual world are displayed on the display 100 as controlled by the first input control 322 and the second input control 321. As shown, the first input control 322 and the second input control 321 are received by a display driver 130 which processes the inputs, generating the translational movement of and field of view controls for the display 100.

The gaming and game weapon system provided by the video game apparatus of FIG. 3 provides an alternative character and weapon control technology that allows the user 370 to arbitrarily and realistically aim the gaming weapon anywhere within a character's field of view. This embodiment has the potential of making FPS games more realistic by allowing the player to actually aim a real "weapon" at any location within a scene that is being shown on the display. This embodiment allows for great extension of the realism of FPS game play.

Figure 4:
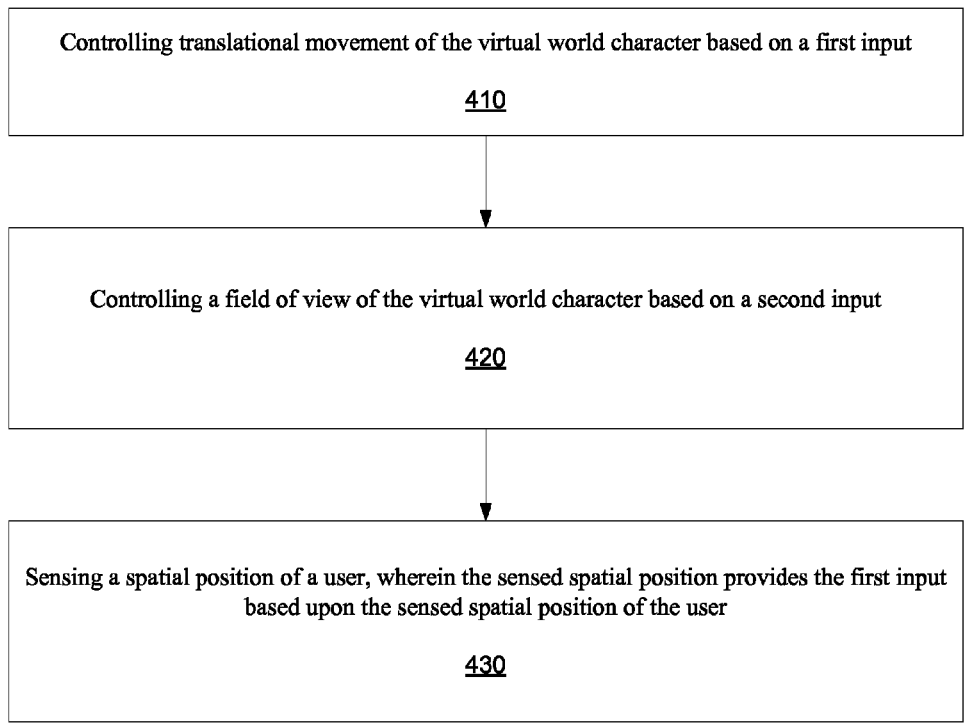
FIG. 4 shows steps of a method of controlling a view of a character within a virtual world on a display based on the sensed spatial position of a user, according to an embodiment.

FIG. 4 shows steps of a method of controlling a view of a character within a virtual world on a display, according to an embodiment. A first step 410 includes controlling translational movement of the character within the virtual world based on a first input. A second step 420 includes controlling a field of view as seen by the character within the virtual world based on a second input. A third step 430 includes sensing a spatial position of a user, wherein the sensed spatial position provides the first input based upon the sensed spatial position of the user.

As previously described, for an embodiment, the movement of the character includes forwards, backwards, strafe left, strafe right, up and down. For an embodiment, the movement of the character of the first input control is strictly relative to a center of a current field of view displayed on the display.

As previously described, for an embodiment, the field of view as seen by the character within the virtual world includes pan up, pan down, pan left and pan right. For an embodiment, the field of view as seen by the character within the virtual world of the second input control redirects movement within a scene that the first input controls.

As previously described, for an embodiment, the sensed spatial position of the user comprises a sensed spatial position of the user's head.

Although specific embodiments have been described and illustrated, the described embodiments are not to be limited to the specific forms or arrangements of parts so described and illustrated. The embodiments are limited only by the appended claims.

What is claimed:

1. A video game apparatus, comprising:
   a controller operative to control translational movement and field of a view of a character within a virtual world as rendered on a display based upon a first input and second input, wherein the first input controls the translational movement of the view of the character within the virtual world, wherein the translational movement includes X, Y, and Z coordinates of the virtual world, and the second input controls the field of view of the character within the virtual, wherein the field of view includes rotational movement within the virtual world; and
   a sensor, for sensing a spatial position of a user in three dimensions, wherein the sensor provides the first input based on the sensed spatial position of the user.

2. The apparatus of claim 1, wherein the translational movement of the view of the character within the virtual world includes forwards, backwards, strafe left and strafe right.

3. The apparatus of claim 1, wherein the translational movement of the view of the character within the virtual world of the first input control is strictly relative to and along a direction of a line of motion when moving forwards and backwards, or exactly orthogonal to the direction of the line when strafing left, strafing right, jumping up or crouching down.

4. The apparatus of claim 1, wherein the translational movement of the view of the character within the virtual world of the first input control is strictly relative to a center of a current field of view displayed on the display.

5. The apparatus of claim 1, wherein the field of view of the character within the virtual world includes pan up, pan down, pan left and pan right.

6. The apparatus of claim 1, wherein the field of view of the character within the virtual world of the second input control redirects movement within a scene that the first input controls.

7. The apparatus of claim 1, wherein the sensed spatial position of the user comprises a sensed spatial position of the user's head.

8. The apparatus of claim 1, wherein the user controls the translational movement and the field of view as seen by the character within the virtual world as rendered on the display, and wherein the character within the virtual world is associated with a first person shooter game.

9. The apparatus of claim 1, wherein the translational movement allows the user to adjust an aiming of cross-hairs of a gaming weapon controlled by the character within a particular scene.

10. The apparatus of claim 9, wherein the particular scene remains static while the cross-hairs of the gaming weapon are controllably adjusted.

11. The apparatus of claim 1, further comprising a joy-stick for providing the second input.

12. The apparatus of claim 1, wherein the sensor comprises a camera.

13. The apparatus of claim 12, wherein the camera is located proximate to the display and senses spatial position of a body part of the user.

14. The apparatus of claim 1, wherein the sensor comprises a plurality of cameras, and senses changes in a depth position of the user relative to the display.

15. A method of controlling a view of a character within a virtual world rendered on a display, comprising:
   controlling, by a controller, translational movement of the character within the virtual world based on a first input, wherein the translational movement includes X, Y and Z coordinates of the virtual world;

controlling, by the controller, a field of view of the character within the virtual world based on a second input, wherein the field of view includes rotational movement within the virtual world; and generating, by a sensor, the first input based upon sensing a spatial position of a user in three dimensions.

16. The method of claim 15, wherein the translational movement of the view of the character within the virtual world includes forwards, backwards, strafe left and strafe right.

17. The method of claim 15, wherein the translational movement of the view of the character within the virtual world of the first input control is strictly relative to and along a direction of a line of motion when moving forwards and backwards, or exactly orthogonal to the direction of the line when strafing left, strafing right, jumping up or crouching down.

18. The method of claim 14, wherein the translational movement of the view of the character within the virtual world of the first input control is strictly relative to a center of a current field of view displayed on the display.

19. The method of claim 15, wherein the field of view of the character within the virtual world includes pan up, pan down, pan left and pan right.

20. The method of claim 15, wherein the field of view of the character within the virtual world of the second input control redirects movement within a scene that the first input controls.

* * * * *